United States Patent
Peiffer et al.

(10) Patent No.: US 8,548,373 B2
(45) Date of Patent: *Oct. 1, 2013

(54) METHODS AND APPARATUS FOR IDENTIFYING A DIGITAL AUDIO SIGNAL

(75) Inventors: John C. Peiffer, New Port Richey, FL (US); Michael A. Hicks, Clearwater, FL (US); David H. Wright, Safety Harbor, FL (US); Paul M. Mears, Safety Harbor, FL (US); Venugopal Srinivasan, Palm Harbor, FL (US); Daozheng Lu, Dunedin, FL (US); Paul C. Kempter, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 693 days.

This patent is subject to a terminal disclaimer.

(21) Appl. No.: 12/760,712

(22) Filed: Apr. 15, 2010

(65) Prior Publication Data

US 2010/0198380 A1 Aug. 5, 2010

Related U.S. Application Data

(63) Continuation of application No. 10/492,471, filed as application No. PCT/US02/32043 on Oct. 9, 2002, now Pat. No. 7,742,737, which is a continuation of application No. 09/973,893, filed on Jan. 8, 2002, now abandoned.

(51) Int. Cl.
*H04H 60/44* (2008.01)

(52) U.S. Cl.
USPC ............ 455/2.01; 455/3.06; 455/418; 700/94; 725/9; 725/14; 725/18

(58) Field of Classification Search
USPC ............... 455/94, 334, 185.1, 412.165, 2.01, 455/3.06, 418, 135, 553.1, 78, 77, 702, 192.2, 455/405, 12.1, 226.1, 186.1, 352, 5.1; 700/94; 725/9, 14, 18, 19, 8, 80, 81, 68, 100, 135, 725/58, 88, 102; 386/124, E05.001, E05.003; 707/1; 375/240.11, 206, 295, 200; 370/208, 370/320, 335, 342
See application file for complete search history.

(56) References Cited

U.S. PATENT DOCUMENTS 3,372,233 A 3/1968 Currey
3,845,391 A 10/1974 Crosby (Continued)

FOREIGN PATENT DOCUMENTS

AU 678163 11/1993
AU 747044 9/2000

(Continued)

OTHER PUBLICATIONS

Japanese Patent Office, English translation of Information Statement of Video Research filed in counterpart Japanese application No. 2000-548980.

(Continued)

*Primary Examiner* — Tan Trinh
(74) *Attorney, Agent, or Firm* — Hanley, Flight and Zimmerman, LLC

(57) ABSTRACT

Methods and apparatus for identifying a digital audio signal are described. An example apparatus for identifying a digital audio signal includes an input to receive the digital audio signal, which includes data from a broadcast or a stored digital program signal. The example apparatus also includes a detector to receive the digital audio signal from the input and determine whether the received digital audio signal is uncompressed as received at the input; a decoder to receive the digital audio signal from the detector when the digital audio signal is compressed as received at the input and identify any first program-identifying code in an auxiliary field of the compressed digital audio signal; and a code reader to receive the digital audio signal from the detector when the digital audio signal is uncompressed as received at the input and receive the digital audio signal from a decompressor when the digital audio signal is compressed as received at the input. Additionally, the code reader is to identify any second program-identifying code in a decompressed or uncompressed portion of the digital audio signal when the first program-identifying code is not identified in the auxiliary field or when the digital audio signal is uncompressed as received at the input.

20 Claims, 4 Drawing Sheets

(56) References Cited

U.S. PATENT DOCUMENTS

| | | | |
|---|---|---|---|
| 3,919,479 | A | 11/1975 | Moon et al. |
| 4,025,851 | A | 5/1977 | Haselwood et al. |
| 4,027,332 | A | 5/1977 | Wu et al. |
| 4,230,990 | A | 10/1980 | Lert, Jr. et al. |
| 4,367,488 | A | 1/1983 | Leventer et al. |
| 4,379,947 | A | 4/1983 | Warner |
| 4,547,804 | A | 10/1985 | Greenburg |
| 4,599,644 | A | 7/1986 | Fischer |
| 4,622,583 | A | 11/1986 | Watanabe et al. |
| 4,633,302 | A | 12/1986 | Damoci |
| 4,639,779 | A | 1/1987 | Greenberg |
| 4,647,974 | A | 3/1987 | Butler et al. |
| 4,677,466 | A | 6/1987 | Lert, Jr. et al. |
| 4,697,209 | A | 9/1987 | Kiewit et al. |
| 4,703,476 | A | 10/1987 | Howard |
| 4,706,476 | A | 11/1987 | Memminger et al. |
| 4,718,106 | A | 1/1988 | Weinbiatt |
| 4,739,398 | A | 4/1988 | Thomas et al. |
| 4,764,808 | A | 8/1988 | Solar |
| 4,816,904 | A | 3/1989 | McKenna et al. |
| 4,843,562 | A | 6/1989 | Kenyon et al. |
| 4,847,685 | A | 7/1989 | Gall |
| 4,858,000 | A | 8/1989 | Lu |
| 4,885,632 | A | 12/1989 | Mabey et al. |
| 4,907,079 | A | 3/1990 | Turner et al. |
| 4,912,552 | A | 3/1990 | Allison, III et al. |
| 4,931,871 | A | 6/1990 | Kramer |
| 4,939,515 | A | 7/1990 | Adelson |
| 4,943,973 | A | 7/1990 | Werner |
| 4,945,412 | A | 7/1990 | Kramer |
| 4,955,070 | A | 9/1990 | Welsh et al. |
| 4,963,998 | A | 10/1990 | Maufe |
| 4,965,825 | A | 10/1990 | Harvey et al. |
| 4,969,041 | A | 11/1990 | O'Grady et al. |
| 4,972,503 | A | 11/1990 | Zurlinden |
| 5,003,591 | A | 3/1991 | Kauffman et al. |
| 5,019,899 | A | 5/1991 | Boles et al. |
| 5,079,648 | A | 1/1992 | Maufe |
| 5,113,437 | A | 5/1992 | Best et al. |
| 5,113,518 | A | 5/1992 | Durst, Jr. et al. |
| 5,155,762 | A | 10/1992 | Croquet et al. |
| 5,165,069 | A | 11/1992 | Vitt et al. |
| 5,200,822 | A | 4/1993 | Bronfin et al. |
| 5,251,324 | A | 10/1993 | McMullan, Jr. |
| 5,278,988 | A | 1/1994 | Dejean et al. |
| 5,294,977 | A | 3/1994 | Fisher et al. |
| 5,319,453 | A | 6/1994 | Copriviza et al. |
| 5,319,735 | A | 6/1994 | Preuss et al. |
| 5,373,315 | A | 12/1994 | Dufresne et al. |
| 5,379,345 | A | 1/1995 | Greenberg |
| 5,404,160 | A | 4/1995 | Schober et al. |
| 5,404,161 | A | 4/1995 | Douglass et al. |
| 5,404,377 | A | 4/1995 | Moses |
| 5,425,100 | A | 6/1995 | Thomas et al. |
| 5,432,558 | A | 7/1995 | Kim |
| 5,436,653 | A | 7/1995 | Ellis et al. |
| 5,437,050 | A | 7/1995 | Lamb et al. |
| 5,450,122 | A | 9/1995 | Keene |
| 5,450,490 | A | 9/1995 | Jensen et al. |
| 5,455,630 | A | 10/1995 | McFarland et al. |
| 5,457,807 | A | 10/1995 | Weinblatt |
| 5,463,423 | A | 10/1995 | Tults |
| 5,473,631 | A | 12/1995 | Moses |
| 5,481,294 | A | 1/1996 | Thomas et al. |
| 5,481,370 | A | 1/1996 | Kim |
| 5,485,518 | A | 1/1996 | Hunter et al. |
| 5,488,408 | A | 1/1996 | Maduzia et al. |
| 5,490,060 | A | 2/1996 | Malec et al. |
| 5,495,282 | A | 2/1996 | Mostafa et al. |
| 5,497,185 | A | 3/1996 | Dufresne et al. |
| 5,504,518 | A | 4/1996 | Ellis et al. |
| 5,512,933 | A | 4/1996 | Wheatley et al. |
| 5,526,427 | A | 6/1996 | Thomas et al. |
| 5,532,732 | A | 7/1996 | Yuen et al. |
| 5,559,549 | A | 9/1996 | Hendricks et al. |
| 5,572,246 | A | 11/1996 | Ellis et al. |
| 5,574,962 | A | 11/1996 | Fardeau et al. |
| 5,579,124 | A | 11/1996 | Aijala et al. |
| 5,581,658 | A | 12/1996 | O'Hagan et al. |
| 5,581,800 | A | 12/1996 | Fardeau et al. |
| 5,585,858 | A * | 12/1996 | Harper et al. ................. 348/485 |
| 5,594,934 | A | 1/1997 | Lu et al. |
| 5,600,364 | A | 2/1997 | Hendricks et al. |
| 5,608,445 | A | 3/1997 | Mischler |
| 5,612,729 | A | 3/1997 | Ellis et al. |
| 5,612,943 | A | 3/1997 | Moses et al. |
| 5,621,454 | A | 4/1997 | Ellis et al. |
| 5,629,739 | A | 5/1997 | Dougherty |
| 5,630,203 | A | 5/1997 | Weinblalt |
| 5,646,675 | A * | 7/1997 | Copriviza et al. ............... 725/22 |
| 5,650,825 | A | 7/1997 | Naimpally et al. |
| 5,652,615 | A | 7/1997 | Bryant et al. |
| 5,654,748 | A | 8/1997 | Malthews, III |
| 5,659,350 | A | 8/1997 | Hendricks et al. |
| 5,676,282 | A | 10/1997 | Satterfield |
| 5,682,463 | A | 10/1997 | Allen et al. |
| 5,689,509 | A | 11/1997 | Gaytan et al. |
| 5,701,582 | A | 12/1997 | DeBey |
| 5,719,634 | A | 2/1998 | Keery et al. |
| 5,726,701 | A | 3/1998 | Needham |
| 5,734,444 | A | 3/1998 | Yoshinobu |
| 5,737,025 | A | 4/1998 | Dougherty et al. |
| 5,737,026 | A | 4/1998 | Lu et al. |
| 5,757,414 | A | 5/1998 | Thorne |
| 5,764,763 | A | 6/1998 | Jensen et al. |
| 5,768,426 | A | 6/1998 | Rhoads |
| 5,771,307 | A | 6/1998 | Lu et al. |
| 5,774,452 | A | 6/1998 | Wolosewicz |
| 5,787,334 | A | 7/1998 | Fardeau et al. |
| 5,793,414 | A | 8/1998 | Shaffer |
| 5,793,759 | A | 8/1998 | Rakib et al. |
| 5,798,785 | A | 8/1998 | Hendricks et al. |
| 5,809,160 | A | 9/1998 | Powell et al. |
| 5,815,297 | A | 9/1998 | Ciciora |
| 5,815,671 | A | 9/1998 | Morrison |
| 5,819,156 | A | 10/1998 | Belmont |
| 5,822,360 | A | 10/1998 | Lee et al. |
| 5,822,436 | A | 10/1998 | Rhoads |
| 5,825,976 | A | 10/1998 | Dorward et al. |
| 5,826,164 | A | 10/1998 | Weinblatt |
| 5,830,065 | A * | 11/1998 | Sitrick ............................. 463/31 |
| 5,842,010 | A | 11/1998 | Jain et al. |
| 5,848,155 | A | 12/1998 | Cox |
| 5,848,396 | A | 12/1998 | Gerace |
| 5,850,249 | A | 12/1998 | Massetti et al. |
| 5,857,190 | A | 1/1999 | Brown |
| 5,872,588 | A | 2/1999 | Aras et al. |
| 5,880,789 | A | 3/1999 | Inaba |
| 5,881,360 | A | 3/1999 | Fong |
| 5,889,548 | A | 3/1999 | Chan |
| 5,898,836 | A | 4/1999 | Freivald et al. |
| 5,905,865 | A | 5/1999 | Palmer et al. |
| 5,910,988 | A | 6/1999 | Ballard |
| 5,914,746 | A | 6/1999 | Matthews, III et al. |
| 5,915,027 | A | 6/1999 | Cox et al. |
| 5,930,369 | A | 7/1999 | Cox et al. |
| 5,940,135 | A | 8/1999 | Petrovic et al. |
| 5,956,624 | A * | 9/1999 | Hunsinger et al. ............... 455/65 |
| 5,966,120 | A | 10/1999 | Arazi et al. |
| 5,973,625 | A | 10/1999 | Nam |
| 5,973,750 | A | 10/1999 | Ogawa et al. |
| 5,974,299 | A | 10/1999 | Massetti |
| 5,978,842 | A | 11/1999 | Noble et al. |
| 5,999,689 | A | 12/1999 | Iggulden |
| 6,002,443 | A | 12/1999 | Iggulden |
| 6,014,407 | A * | 1/2000 | Hunsinger et al. ............. 375/140 |
| 6,029,045 | A | 2/2000 | Picco et al. |
| 6,031,577 | A | 2/2000 | Ozkan et al. |
| 6,035,177 | A | 3/2000 | Moses et al. |
| 6,061,793 | A | 5/2000 | Tewfik et al. |
| 6,064,748 | A | 5/2000 | Hogan |
| 6,069,914 | A | 5/2000 | Cox |
| 6,072,888 | A | 6/2000 | Powell et al. |
| 6,081,783 | A | 6/2000 | Divine et al. |

| Patent No. | Date | Inventor |
|---|---|---|
| 6,085,066 A | 7/2000 | Fong |
| 6,112,053 A | 8/2000 | Dunki-Jacobs et al. |
| 6,118,873 A | 9/2000 | Lotspiech et al. |
| 6,124,877 A | 9/2000 | Schmidt |
| 6,128,736 A | 10/2000 | Miller |
| 6,130,726 A | 10/2000 | Darbee et al. |
| 6,151,578 A | 11/2000 | Bourcet et al. |
| 6,154,484 A | 11/2000 | Lee et al. |
| 6,154,571 A | 11/2000 | Cox et al. |
| 6,157,719 A | 12/2000 | Wasilewski et al. |
| 6,160,570 A | 12/2000 | Sitnik |
| 6,169,843 B1 | 1/2001 | Lenihan et al. |
| 6,175,639 B1 | 1/2001 | Satoh et al. |
| 6,184,918 B1 | 2/2001 | Goldschmidt Iki et al. |
| 6,192,427 B1 | 2/2001 | Li et al. |
| 6,202,210 B1 | 3/2001 | Ludtke |
| 6,208,735 B1 | 3/2001 | Cox et al. |
| 6,215,526 B1 | 4/2001 | Barton et al. |
| 6,219,634 B1 | 4/2001 | Levine |
| 6,229,924 B1 | 5/2001 | Rhoads et al. |
| 6,243,481 B1 | 6/2001 | Tao |
| 6,252,631 B1 | 6/2001 | Lakhami |
| 6,259,443 B1 | 7/2001 | Williams, Jr. |
| 6,259,801 B1 | 7/2001 | Wakasu |
| 6,263,087 B1 | 7/2001 | Miller |
| 6,266,096 B1 | 7/2001 | Gutsmann et al. |
| 6,268,866 B1 | 7/2001 | Shibata |
| 6,272,176 B1 | 8/2001 | Srinivasan |
| 6,278,792 B1 | 8/2001 | Cox et al. |
| 6,286,140 B1 | 9/2001 | Ivanyi |
| 6,289,514 B1 | 9/2001 | Link et al. |
| 6,298,142 B1 | 10/2001 | Nakano et al. |
| 6,301,369 B2 | 10/2001 | Powell et al. |
| 6,307,950 B1 | 10/2001 | Powell et al. |
| 6,332,194 B1 | 12/2001 | Bloom et al. |
| 6,338,037 B1 | 1/2002 | Todd et al. |
| 6,343,138 B1 | 1/2002 | Rhoads |
| 6,353,929 B1 | 3/2002 | Houston |
| 6,359,573 B1 | 3/2002 | Taruguchi et al. |
| 6,373,960 B1 | 4/2002 | Conover et al. |
| 6,385,330 B1 | 5/2002 | Powell et al. |
| 6,400,827 B1 | 6/2002 | Rhoads |
| 6,404,898 B1 | 6/2002 | Rhoads |
| 6,415,041 B1 | 7/2002 | Oami et al. |
| 6,421,445 B1 | 7/2002 | Jensen et al. |
| 6,421,450 B2 | 7/2002 | Nakano |
| 6,424,726 B2 | 7/2002 | Nakano et al. |
| 6,424,816 B1 | 7/2002 | Stephens |
| 6,438,252 B2 | 8/2002 | Miller |
| 6,453,053 B1 | 9/2002 | Wakasu |
| 6,456,724 B1 | 9/2002 | Watanabe |
| 6,459,803 B1 | 10/2002 | Powell et al. |
| 6,467,089 B1 | 10/2002 | Aust et al. |
| 6,469,749 B1 | 10/2002 | Dimitrova et al. |
| 6,470,090 B2 | 10/2002 | Oami et al. |
| 6,473,903 B2 | 10/2002 | Balakrishnan et al. |
| 6,477,707 B1 | 11/2002 | King |
| 6,493,457 B1 | 12/2002 | Quackenbush et al. |
| 6,496,591 B1 | 12/2002 | Rhoads |
| 6,505,223 B1 | 1/2003 | Haitsma et al. |
| 6,507,299 B1 | 1/2003 | Nuijten |
| 6,510,233 B1 | 1/2003 | Nakano |
| 6,510,557 B1 | 1/2003 | Thrift |
| 6,512,796 B1 | 1/2003 | Sherwood |
| 6,513,161 B2 | 1/2003 | Wheeler et al. |
| 6,519,769 B1 | 2/2003 | Hopple et al. |
| 6,523,175 B1 | 2/2003 | Chan |
| 6,530,082 B1 | 3/2003 | Del Sesto et al. |
| 6,539,095 B1 | 3/2003 | Rhoads |
| 6,542,620 B1 | 4/2003 | Rhoads |
| 6,553,070 B2 | 4/2003 | Hashimoto |
| 6,560,350 B2 | 5/2003 | Rhoads |
| 6,563,880 B1 * | 5/2003 | Hunsinger et al. ............ 375/260 |
| 6,567,780 B2 | 5/2003 | Rhoads |
| 6,574,350 B1 | 6/2003 | Rhoads |
| 6,574,594 B2 | 6/2003 | Pitman et al. |
| 6,577,346 B1 | 6/2003 | Perlman |
| 6,584,138 B1 | 6/2003 | Neubauer et al. |
| 6,590,998 B2 | 7/2003 | Rhoads |
| 6,597,405 B1 | 7/2003 | Iggulden |
| 6,604,072 B2 | 8/2003 | Pitman et al. |
| 6,611,607 B1 | 8/2003 | Davis et al. |
| 6,614,915 B2 | 9/2003 | Powell et al. |
| 6,633,651 B1 | 10/2003 | Hirzalla et al. |
| 6,647,129 B2 | 11/2003 | Rhoads |
| 6,647,130 B2 | 11/2003 | Rhoads |
| 6,647,548 B1 | 11/2003 | Lu et al. |
| 6,664,976 B2 | 12/2003 | Lofgren et al. |
| 6,665,419 B1 | 12/2003 | Oami |
| 6,668,068 B2 | 12/2003 | Hashimoto |
| 6,675,383 B1 | 1/2004 | Wheeler et al. |
| 6,678,392 B2 | 1/2004 | Powell et al. |
| 6,678,740 B1 | 1/2004 | Rakib et al. |
| 6,697,499 B2 | 2/2004 | Oami |
| 6,700,993 B1 | 3/2004 | Minematsu |
| 6,724,911 B1 | 4/2004 | Cox et al. |
| 6,725,412 B1 | 4/2004 | Smithers et al. |
| 6,735,325 B2 | 5/2004 | Wakasu |
| 6,735,775 B1 | 5/2004 | Massetti |
| 6,738,493 B1 | 5/2004 | Cox et al. |
| 6,738,744 B2 * | 5/2004 | Kirovski et al. ............... 704/273 |
| 6,738,978 B1 | 5/2004 | Hendricks et al. |
| 6,751,221 B1 | 6/2004 | Saito et al. |
| 6,754,377 B2 | 6/2004 | Rhoads |
| 6,785,399 B2 | 8/2004 | Fujihara |
| 6,785,903 B1 | 8/2004 | Kuh |
| 6,788,800 B1 | 9/2004 | Carr et al. |
| 6,798,893 B1 | 9/2004 | Tanaka |
| 6,807,528 B1 | 10/2004 | Truman et al. |
| 6,826,289 B1 | 11/2004 | Hashimoto |
| 6,829,368 B2 | 12/2004 | Meyer et al. |
| 6,834,345 B2 | 12/2004 | Bloom et al. |
| 6,839,751 B1 | 1/2005 | Dietz et al. |
| 6,853,737 B2 | 2/2005 | Watanabe |
| 6,856,693 B2 | 2/2005 | Miller |
| 6,915,000 B1 | 7/2005 | Tanaka |
| 6,928,165 B1 | 8/2005 | Takai |
| 6,947,562 B2 | 9/2005 | Hashimoto |
| 6,947,572 B2 | 9/2005 | Terasaki |
| 6,959,386 B2 | 10/2005 | Rhoads |
| 6,968,564 B1 | 11/2005 | Srinivasan |
| 6,996,249 B2 | 2/2006 | Miller et al. |
| 7,007,167 B2 | 2/2006 | Kurahashi |
| 7,027,611 B2 | 4/2006 | Hashimoto |
| 7,050,604 B2 | 5/2006 | Fujihara et al. |
| 7,051,207 B2 | 5/2006 | Watanabe |
| 7,092,546 B2 | 8/2006 | Tanaka |
| 7,114,073 B2 | 9/2006 | Watanabe |
| 7,137,892 B2 * | 11/2006 | Sitrick ............................ 463/31 |
| 7,146,501 B2 | 12/2006 | Tanaka |
| 7,149,324 B2 | 12/2006 | Tanaka |
| 7,159,117 B2 | 1/2007 | Tanaka |
| 7,316,025 B1 | 1/2008 | Aijala et al. |
| 7,587,601 B2 | 9/2009 | Levy et al. |
| 7,617,509 B1 | 11/2009 | Brunheroto et al. |
| 7,742,737 B2 * | 6/2010 | Peiffer et al. ................ 455/2.01 |
| 8,255,938 B2 | 8/2012 | Lee |
| 2001/0005823 A1 | 6/2001 | Fischer et al. |
| 2001/0026616 A1 | 10/2001 | Tanaka |
| 2001/0031064 A1 | 10/2001 | Donescu |
| 2001/0047478 A1 | 11/2001 | Mase |
| 2001/0053235 A1 | 12/2001 | Sato |
| 2001/0053237 A1 | 12/2001 | Hashimoto |
| 2002/0006203 A1 | 1/2002 | Tachibana |
| 2002/0010919 A1 | 1/2002 | Lu et al. |
| 2002/0059577 A1 | 5/2002 | Lu et al. |
| 2002/0059632 A1 | 5/2002 | Link et al. |
| 2002/0085736 A1 | 7/2002 | Kalker |
| 2002/0085737 A1 | 7/2002 | Kitamura |
| 2002/0097891 A1 | 7/2002 | Hinishi |
| 2002/0106106 A1 | 8/2002 | Sato |
| 2002/0114299 A1 | 8/2002 | Lu et al. |
| 2002/0120925 A1 | 8/2002 | Logan |
| 2002/0129253 A1 | 9/2002 | Langelaar |
| 2002/0138736 A1 | 9/2002 | Morin |
| 2002/0147990 A1 | 10/2002 | Lu et al. |
| 2002/0162118 A1 | 10/2002 | Levy et al. |
| 2002/0178410 A1 | 11/2002 | Haitsma et al. |

| | | | |
|---|---|---|---|
| 2002/0186768 | A1 | 12/2002 | Dimitrova et al. |
| 2003/0005430 | A1 | 1/2003 | Kolessar |
| 2003/0023967 | A1 | 1/2003 | Kim |
| 2003/0037333 | A1 | 2/2003 | Ghashghai et al. |
| 2003/0051249 | A1 | 3/2003 | Hoang |
| 2003/0066070 | A1 | 4/2003 | Houston |
| 2003/0081781 | A1 | 5/2003 | Jensen et al. |
| 2003/0086341 | A1 | 5/2003 | Wells et al. |
| 2003/0131350 | A1 | 7/2003 | Peiffer et al. |
| 2003/0133590 | A1 | 7/2003 | Miller et al. |
| 2003/0169879 | A1 | 9/2003 | Akins, III et al. |
| 2004/0024588 | A1 | 2/2004 | Watson et al. |
| 2004/0059918 | A1 | 3/2004 | Xu |
| 2004/0122679 | A1 | 6/2004 | Neuhauser et al. |
| 2004/0181799 | A1 | 9/2004 | Lu et al. |
| 2004/0210922 | A1 | 10/2004 | Peiffer et al. |
| 2005/0020223 | A1 | 1/2005 | Ellis et al. |
| 2005/0177361 | A1 | 8/2005 | Srinivasan |
| 2005/0196151 | A1 | 9/2005 | Takagi et al. |
| 2006/0171474 | A1 | 8/2006 | Ramaswamy et al. |
| 2007/0040934 | A1 | 2/2007 | Ramaswamy et al. |
| 2012/0291058 | A1 | 11/2012 | Lee |

FOREIGN PATENT DOCUMENTS

| | | |
|---|---|---|
| AU | 2004201423 | 4/2004 |
| AU | 718227 | 11/2006 |
| EP | 0161512 | 4/1985 |
| EP | 255383 | 5/1985 |
| EP | 0161512 | 11/1985 |
| EP | 0195639 | 3/1986 |
| EP | 0210609 | 7/1986 |
| EP | 0687083 | 12/1995 |
| EP | 0703683 | 3/1996 |
| EP | 0840511 | 5/1998 |
| EP | 0913952 | 5/1999 |
| EP | 0986047 | 3/2000 |
| EP | 1041767 | 10/2000 |
| EP | 1043854 | 10/2000 |
| FR | 2717025 | 9/2005 |
| GB | 2063018 | 5/1981 |
| GB | 2063018 | 10/1981 |
| GB | 2196167 | 4/1988 |
| GB | 2260246 | 4/1993 |
| GB | 2292506 | 2/1996 |
| GB | 2338869 | 12/1999 |
| JP | 01-177796 | 7/1989 |
| JP | 3173291 | 7/1991 |
| JP | 09-083470 | 3/1997 |
| JP | 10-145823 | 5/1998 |
| JP | 8-508617 | 10/1999 |
| JP | 11-275032 | 10/1999 |
| JP | 2000517141 | 12/2000 |
| KR | 1993-006665 | 7/1993 |
| WO | 8810540 | 12/1988 |
| WO | 9111062 | 7/1991 |
| WO | 93/07689 | 4/1993 |
| WO | 9322875 | 11/1993 |
| WO | 9411989 | 5/1994 |
| WO | 9512278 | 4/1995 |
| WO | 9515653 | 6/1995 |
| WO | 9527349 | 10/1995 |
| WO | 9832251 | 7/1998 |
| WO | 9933206 | 7/1999 |
| WO | 9959275 | 11/1999 |
| WO | 9962260 | 12/1999 |
| WO | 9963443 | 12/1999 |
| WO | 0065765 | 11/2000 |
| WO | 01/61892 A2 | 8/2001 |
| WO | 0215410 | 2/2002 |
| WO | 0262007 | 2/2002 |
| WO | 0237316 | 5/2002 |
| WO | 0249363 | 6/2002 |
| WO | 02091361 | 11/2002 |
| WO | 03007235 | 1/2003 |
| WO | 03026169 | 3/2003 |
| WO | 03060630 | 7/2003 |
| WO | 2004/038538 | 5/2004 |
| WO | 2005002200 | 1/2005 |
| WO | 2005006768 | 1/2005 |
| WO | 2005008582 | 1/2005 |
| WO | 2005099385 | 10/2005 |

OTHER PUBLICATIONS

Advanced Television Systems Committee, "Program and System Information Protocol for Terrestrial Broadcast and Cable (Revision A) and Amendment No. 1. Doc. N65A" May 31, 2000.

Advanced Television Systems Committee, T3/S8 Transport Specialist Group. "Annex G—An Overview of PSIP for Cable." ATSC T3/S8 Doc. 268. Apr. 3, 1998.

Advanced Television Systems Committee, "Guide to the Use of the ATSC Digital Television Standard." pp. 1-148 (2003).

Advanced Television Systems Committee, "Program/Episode Version Identification. ATSC Standard." Doc. A/57. Aug. 30, 1996.

European Patent Office, Communication Pursuant to Article 115(2) EPC for European Patent Application No. 00114272.8, with attached Observation of third party (Aug. 14, 2003).

European Patent Office, European Search Report, date of completion Oct. 3, 2000, Application No. EP 00 11 4271.

European Patent Office, European Search Report, date of completion Oct. 5, 2000, Application No. EP 00 11 4272.

International Search Authority, International Search Report, dated Jul. 1, 1999, Application No. PCT/US98/14286.

V. Balabanian et al. An Introduction to Digital Storage Media—Command and Control (OSM-CC). IEEE Communications Magazine, Nov. 1996.

International Search Authority, International Search Report for PCT/US97109218, dated Oct. 17, 1997.

International Search Authority, International Search Report for PCT/US94/11795, dated Feb. 24, 1995.

International Search Authority, International Search Report for PCT/US02/32043, issued Aug. 21, 2003 (4 pages).

International Search Authority, International Preliminary Examination Report for international application PCT/US02/32043, mailed Feb. 26, 2004 (4 pages).

International Search Authority, "International Search Report." International Search Authority for PCT/US2002/03705, Sep. 11, 2002 (2 pages).

United States Patent and Trademark Office, Official Action issued in U.S. Appl. No. 11/535,269, Jan. 9, 2009, 11 pages.

United States Patent and Trademark Office, Official Action issued in U.S. Appl. No. 11/535,269, Jun. 25, 2009 (9 pages).

Intellectual Property Corporation of Malaysia, Substantive/Modified Substantive Examination Adverse Report for MY Application No. PI20051568, mailed May 22, 2009 (5 pages).

Patent Cooperation Treaty, Written Opinion for PCT/US2004/018953, Apr. 29, 2005 (7 pages).

Patent Cooperation Treaty, International Search Report for PCT/US2004/018953 Apr. 29, 2005 (2 pages).

United States Patent and Trademark Office, Official Action issued in U.S. Appl. No. 09/973,893, Jul. 24, 2008 (8 pages).

United States Patent and Trademark Office, Official Action issued in U.S. Appl. No. 09/973,893, Jan. 7, 2008 (9 pages).

Schneider et al., "A Robust Content Based Digital Signature for Image Authentication", 1996.

Dolby, "The Growth of Dolby Digital (AC-3) in Consumer Products", May 23, 2002, http://www.dolby.com/digital/growth.html.

Dolby, "The Selection of Audio Coding Technologies for Digital Delivery Systems", May 23, 2002, http://www.dolby.com/dvd/selcode.html.

Dolby, "The AC-3 Multichannel Coder", May 23, 2002, http://www.dolby.com/tech/ac-3mult.html.

International Search Authority, International Search Report for PCT/US05/05271, dated Jan. 22, 2004, 3 sheets.

Patent Cooperation Treaty, International Preliminary Report on Patentability PCT/US03/22562, Oct. 30, 2007 (3 Pages).

Canadian Intellectual Property Office, First Office Action in connection with related Canadian Application No. 2,530,012, issued May 25, 2009 (5 pages).

Mexican Institution of the Industrial Property, Second Office Action in connection with related Mexican Application No. PA/a/2005/014162, issued Dec. 2, 2008 (3 pages).

United States Patent and Trademark Office, Official Action in connection with U.S. Appl. No. 11/312,789, Nov. 17, 2009 (18 pages).

United States Patent and Trademark Office, Official Action, issued in U.S. Appl. No. 11/312,789, Apr. 29, 2009 (18 pages).

United States Patent and Trademark Office, Official Action, issued in U.S. Appl. No. 11/312,789, Oct. 21, 2008 (17 pages).
State Intellectual Property Office of China, Chinese language and English Translation of "Notice of Completion of Formalities for Patent Registration", issued by the State Intellectual Property Office of China on Aug. 1, 2008 (5 pages).
United States Patent and Trademark Office, Office Action, issued by the Mexicano la Propiedad Industrial on Feb. 5, 2009 (2 pages).
CITESEER.IST, "Content-Based Digital Watermarking for Compressed Audio (2000)", 1995-2000, Citeseer.ist.psu.edu (1 page).
"Digital Audio Watermarking", Audio Media, Jan./Feb. 1998 (pp. 56, 57, 59, and 61).
Fraunhofer Iis, "Audio & Multimedia Watermarking", http://www.iis.fraunhofer.de/amm/techinf/water/, 1998-2006, 7 pages.
United States Patent and Trademark Office, Official Action issued in U.S. Appl. No. 11/535,269, Jul. 30, 2008 (10 pages).
Herre, Juergen, "Audio Watermarking in the Bitstream Domain", IEEE, Jun. 12-13, 2000 (23 pages).
Patent Cooperation Treaty, International Preliminary Examination Report, for PCT/US03/28037, Mar. 15, 2007 (4 pages).
Patent Cooperation Treaty, International Search Report for PCT/US2003/28037, Feb. 28, 2005 (3 pages).
Patent Cooperation Treaty, Written Opinion for PCT/US2003/28037, Oct. 12, 2006 (4 pages).
The Arbitron Company, Arbitron Patent Specification ZA 92/7317; Method and Apparatus for Automatically Identifying a Program Including Sound Signal, Sep. 24, 1992 (30 pages).
United States Patent and Trademark Office, Official Action issued in U.S. Appl. No. 11/237,251, Nov. 24, 2009 (9 pages).
Decarmo, Linden, "Pirates on the Airwaves," Sep. 1999 (7 pages).
Cheung, W.N., "Digital Image Watermarking in Spatial and Transform Domains," Sep. 3, 2000 (5 pages).
Abdulaziz et al., "Wavelet Transform and Channel Coding for Hiding in Video," Oct. 29, 2001-Nov. 1, 2001 (6 pages).
Linang et al., "Video Watermarking Combining with Hybrid Coding Scheme," Apr. 19, 2005 (4 pages).
Patent Cooperation Treaty, International Search Report for PCT/US2004/18645, Apr. 19, 2005, (4 pages).
Patent Cooperation Treaty, Written Opinion for PCT/US2004/18645, Apr. 19, 2005 (5 pages).
United States Patent and Trademark Office, Official Action issued in U.S. Appl. No. 11/312,789, Sep. 3, 2009 (2 pages).
United States Patent and Trademark Office, Office Action issued in connection with U.S. Appl. No. 10/492,471 dated Feb. 5, 2008.
United States Patent and Trademark Office, Office Action issued in connection with U.S. Appl. No. 10/492,471 dated Jun. 16, 2008.
United States Patent and Trademark Office, Office Action issued in connection with U.S. Appl. No. 10/492,471 dated Dec. 3, 2008.
United States Patent and Trademark Office, Office Action issued in connection with U.S. Appl. No. 10/492,471 dated May 26, 2009.
United States Patent and Trademark Office, Notice of Allowance issued in connection with U.S. Appl. No. 10/492,471 dated Oct. 26, 2009.
United States Patent and Trademark Office, Notice of Allowance issued in connection with U.S. Appl. No. 10/492,471 dated Jan. 15, 2010.
United States Patent and Trademark Office, Supplemental Notice of Allowability, issued in connection with U.S. Appl. No. 10/492,471, dated Mar. 15, 2010.
United States Patent and Trademark Office, Notice of Allowance issued in connection with U.S. Appl. No. 11/535,269 on Aug. 6, 2010 (4 pages).
European Patent Office, Office Action issued in connection with European Patent Application No. 03749497.8-1247, Nov. 3, 2011, 7 pages.
United States Patent and Trademark Office, Advisory Action in connection with U.S. Appl. No. 11/237,251, Jul. 8, 2010, (6 pages).
Canadian Intellectual Property Office, "Notification of a Requisition by the Examiner in Accordance with Subsection 30(2) of the Patent Rules," in connection with application No. 2503340, Jul. 16, 2010 (3 pages).
United States Patent and Trademark Office, Office Action issued in connection with U.S. Appl. No. 11/312,789, Jan. 6, 2011, (18 pages).
United States Patent and Trademark Office, Notice of Panel Decision from Pre-Appeal Brief Review issued in connection with U.S. Appl. No. 11/312,789, Mar. 21, 2011 (2 pages).
United States Patent and Trademark Office, Office Action issued in connection with U.S. Appl. No. 11/312,789, Jul. 16, 2010 (18 pages).

United States Patent and Trademark Office, Office Action issued in connection with U.S. Appl. No. 11/237,251, May 26, 2010 (7 pages).
United States Patent and Trademark Office, Advisory Action Before the Filing of an Appeal Brief, issued in connection with U.S. Appl. No. 11/237,251, Jul. 8, 2010 (5 pages).
Korean Intellectual Property Office, Notice of Preliminary Rejection, in connection with Korean application No. 10-2005-7007036, Sep. 30, 2010 (2 pages).
Advanced Television Systems Committee, "Digital Audio Compression Standard (AC-3)," Jun. 14, 2005, (236 pages).
Watson, M; Buettner; P. "Design and Implementation of AAC Decoders." Institute of Electrical and Electronics Engineers, Inc. 2000. pp. 408-409.
Xu et al., "Content-Based Digital Watermarking for Compressed Audio." The University of Sydney Department of Computer Science, 2006, (13 pages).
Allison, A. "PSIP 101: What You Need to Know." Broadcastengineering.com. Jun. 2001. pp. 1,142,144.
Advanced Television Systems Committee. "All About PSIP: Roadmap to the DTV Program and System Information Protocol." Broadcast Engineering. Jun. 2001. pp. 1-4.
Watson, Matthew A., Audio engineering society, Convention Paper 5628: Signaling Techniques for Broadcast Applications, May 10-13, 2002 (35 pages).
United States Patent and Trademark Office, Notice of Allowance in connection with U.S. Appl. No. 11/312,789, Jan. 11, 2012 (5 pages).
United States Patent and Trademark Office, Office Action in connection with U.S. Appl. No. 11/312,789, Oct. 5, 2011 (7 pages).
United States Patent and Trademark Office, Office Action in connection with U.S. Appl. No. 11/312,789, Jun. 10, 2011 (6 pages).
United States Patent and Trademark Office, Notice of Panel Decision from Pre-Appeal Brief Review in connection with U.S. Appl. No. 11/312,789, Mar. 21, 2011 (2 pages).
European Patent Office, "Summons to attend oral proceedings pursuant to Rule 115(1) EPC," in connection with application No. 03749497.8-1247/1561341, Mar. 11, 2011 (8 pages).
European Patent Office, "Communication pursuant to Article 94(3) EPC," in connection with application No. 03749497.8-1247, on Mar. 24, 2011 (7 pages).
European Patent Office, Communication: Supplementary European search report under Article 153(7) EPC, in connection with application No. 03749497.8-1247/1561341 PCT/US0328037, Nov. 12, 2010, (3 pages).
Office action issued by the United States Patent and Trademark Office on Apr. 1, 2013 in connection with U.S. Appl. No. 12/942,800.
International Searching Authority, "International Search Report and Written Opinion," issued in connection with PCT Application No. PCT/US05/11630 on Jan. 27, 2012 (8 pages).
International Bureau, "International Preliminary Report on Patentability," issued in connection with PCT Application No. PCT/US05/11630 on Mar. 8, 2012 (7 pages).
TIPO, "Preliminary Examination Report," issued in connection with TW Application No. 094110973 on Feb. 9, 2012 (22 pages).
Canadian Intellectual Property Office, "First Office Action," issued in connection with Canadian Application No. 2,562,137 on Jun. 27, 2011 (4 pages).
Notice of Allowance issued by the United States Patent and Trademark Office in connection with U.S. Appl. No. 11/312,789 on Apr. 26, 2012.
Supplemental European Search Report, issued by the European Patent Office in connection with European Patent Application No. EP03817463 on Oct. 11, 2007 (4 pages).
Patent Examination Report No. 1, issued by the Australian Government in connection with Australian Patent Application No. 2011201930 on Aug. 28, 2012 (3 pages).
Advanced Television Systems Committee, "Digital Audio Compression Standard (AC-3)," Dec. 20, 1995 (pp. 1-65).
Advanced Television Systems Committee, "Digital Audio Compression Standard (AC-3)," Dec. 20, 1995 (pp. 1-128).
Decision to Refuse European Patent application, issued by the European Patent Office in connection with European Patent Application No. 03749497.8-1247 on Apr. 12, 2012 (14 pages).
Supplementary European Search Report, issued by the European Patent Office in connection with European Patent Application No. 03749497.8-1247 on Nov. 12, 2010 (3 pages).

* cited by examiner

METHODS AND APPARATUS FOR IDENTIFYING A DIGITAL AUDIO SIGNAL

RELATED APPLICATIONS

This application is a continuation of application Ser. No. 10/492,471, filed Apr. 12, 2004, which is a national stage entry of PCT/US02/32043, filed on Oct. 9, 2002, which claims the benefit of U.S. patent application Ser. No. 09/973,893, filed on Jan. 8, 2002, all of which are incorporated by reference herein in their entireties.

FIELD OF THE DISCLOSURE

The present invention relates to method and apparatus for identifying a program signal that is broadcast to members of an audience. More particularly, the present invention relates to method and apparatus for identifying a program signal having a digital audio component. Preferably, such method and apparatus will find use in audience measurement and/or broadcast monitoring services.

RELATED ART

Third party measurements are typically used in the broadcasting industry to verify that program elements (e.g., commercials) are disseminated in accordance with contractual arrangements, and to estimate the size and composition of the audience. One measurement technique involves reading an ancillary encoded identification label or signal that is transmitted with the program. Another measurement technique involves extracting characteristic features (commonly called "signatures") from the program, and then comparing the extracted features with a library of features from known program elements.

There is some degree of overlap in the code and signal processing between the above two techniques. If a broadcast program is encoded with a label associating it with a final distributor of the program (e.g., a local news broadcast labeled as such by the originating station), that label may be essentially self-attesting, or may be interpreted by recourse to a master look-up table. On the other hand, if the encoded label only identifies an originator or intermediate distributor (e.g., a syndicated program labeled only with the program name and episode number), then it may be necessary to compare that label with a library of labels collected from a number of local stations, in order to identify the station that transmitted the program in question.

U.S. Pat. No. 5,481,294 to Thomas et al. (incorporated herein by reference) discloses apparatus and method whereby a program signal that is to be identified is initially processed to extract an ancillary identifying code. If the code is found, it is stored along with the time at which it was received or otherwise selected by the user (known as the "read time") in a memory for subsequent transmission to a central data collection and processing facility. If no code is found, a signature is extracted from the program signal, stored as a time-stamped record in the memory, and subsequently communicated to the central facility where it is compared with similar signatures extracted from known programs at monitoring facilities that may be remote from the central facility.

A television measurement system of the sort taught by Thomas et al. may employ codes written into either the video or audio components of the composite broadcast signal, and also may extract signatures from either the video or audio portion of that signal. Moreover, one may configure a system of this sort to extract signatures from a program signal even when an identifying label or code is read. An arrangement of this sort can provide signature data to provide "fill-in" identification at times between sequential transmissions of an audio code.

Also of note is the identification tag reading system disclosed in U.S. Pat. No. 6,202,218 to Ludtke (incorporated herein by reference). The disclosed measurement system is embedded in an in-home entertainment network having consumer electronic equipment adapted to communicate with other such equipment by means of an IEEE 1394 serial interface. Ludtke discloses an arrangement in which a program-identifying label received with a broadcast data stream that is used in the household is read, interpreted, and forwarded to a remote data collection entity.

The advent of digitally-transmitted television signals has had a profound impact on systems for both verifying broadcasts and for determining audience viewing preferences (in dwellings statistically selected to participate in a television audience measurement). For example, some video encoding arrangements that work well with analog video signals are incompatible with digital transmission because such codes, if present on an original analog signal, do not survive the data compression that is part of the process of converting the analog video signal to a digital one. Moreover, there are a variety of applicable digital transmission standards and a variation in the extent to which broadcasters adhere to those standards. For example, in 2001, the U.S. market faced several digital transmission standards: one for over-the-air terrestrial transmission, one for cable distribution, and one for satellite-to-end-user transmission.

Although the audio component of the overall program signal generally utilizes far less valuable bandwidth than does the video component, there is variation among digital audio standards. The ATSC (Advanced Television Systems Committee) standard, for example, mandates the use of what is called AC-3 audio, which could also be carried by direct satellite and cable systems. In 2001, the majority of satellites (Direct Broadcasting Satellite—DBS) and digital cable system were not using AC-3 sound. For example, some U.S. UBS used a standard referred to as Musicam or MPEG1 Layer 2 audio. Other standards, such as the Japanese AAC (Advanced Audio Coding) standard using MPEG2, Layers 1-3, are also known. Of course, many programs are still in a linear PCM format.

Generally speaking, the compressed audio formats call for each audio signal stream to be formatted into frames, where each frame can be configured as a string of packets that can be broadcast at a single frequency, or in a single channel with other audio streams by means of time domain multiplexing. For example, MPEG breaks each frame into a set of fixed-duration packets (where each packet has a header) for multiplexing audio and video bitstreams in one stream with the necessary information to keep the streams synchronized when decoding. Each audio frame is autonomous and contains all the information necessary for decoding so that it can be processed independently of previous or subsequently transmitted frames. Although the length of a frame may vary, depending on the bit rate and sampling frequency, there is a maximum allowed frame length, and smaller frames (i.e., those arising from lower fidelity audio signals) may be padded with dummy data in order to provide a fixed interval between frame headers.

Many of the compressed audio standards set aside portions of selected packets for the transmission of auxiliary data (e.g., signal identification data) that is not part of the audio signal. Moreover, almost all such standards provide for the use of padding bytes in order to provide a fixed interval between frame headers. These padding bytes can, in some cases, be used for the purpose of adding an ancillary program identification label even if a defined auxiliary data field is not provided for in a given standard. Thus, it is expected that in at least the great majority of packetized digital audio broadcasting systems, a program-identifying label can be added to a predetermined portion of a packet or frame.

Consumer electronic equipment for receiving digital broadcasts typically have a standard digital audio output from the receiver to the consumer's digital audio equipment. The receiver may comprise a digital tuner in a set-top box that provides an analog output to an NTSC receiver, a digital television receiver and display, or any of a number of other known audio receivers. Moreover, the use of digital audio equipment has made it common for the consumer digital receiver to supply a digital audio output even if the input to the receiver is an analog broadcast signal or an input from an analog VCR. That is, the consumer's receiving apparatus (that is to be monitored) may be used not only for receiving both analog and digital broadcast program signals, but also for selecting a program signal source from a number of possible local sources such as DVD or CD players.

The industry-standard design for providing a digital audio output signal for use by digital audio equipment is known as the Sony-Philips Digital Interface (SP/DIF). The signal available at an SP/DIF connector may be either a uncompressed linear PCM (Pulse Code Modulated) digital signal having a bit rate of no more than 64 kbit/sec, or may be a non-linear PCM encoded audio bitstreams, such as, in the AC-3 format and having a bit rate of 384 kbit/sec.

Thus, what is needed is a digital signal recognition system which is capable of accurately and reliably recognizing digital audio signals in all of the various configurations and implementations described above.

SUMMARY

It is an object of the present invention to provide method and apparatus for processing received digital audio signals, transmitted through a wide variety of media, to ensure accurate recognition.

According to a first aspect of the present invention, digital audio signal recognition apparatus includes an input connector for direct connection to a standard SP/DIF output connector on consumer digital television receiving equipment. The apparatus includes structure for processing the input digital audio signal to obtain one or more of: (i) an identifying label encoded in a portion of a digital audio frame; (ii) an identifying label code embedded in a decompressed audio signal; (iii) a copy of a selected portion of a frame (e.g., a checksum portion); and (iv) a copy of a selected portion of the decompressed digital audio signal. Preferably, the apparatus also has an SP/DIF output connector and provides a repeated copy of the input digital audio signal at that output, so that the user can use the audio and video equipment without interference by the signal recognition process.

According to another aspect of the present invention, a method of collecting tuning data from digitally transmitted program signals comprise an initial step of obtaining the digital audio signal associated with the program, using a SP/DIF connection. If that signal is a non-linear, PCM encoded audio bitstream signal, an attempt may be made to read a first type of program-identifying label from an auxiliary message portion of the digital signal or to select a predetermined selected portion of the signal frame as a first candidate signature. In addition, the input signal may be decompressed and the measuring equipment may attempt to read a second type of program-identifying label distributed as a code embedded in the audio signal or to generate a second candidate signature from a predetermined part of the decompressed audio signal. Of course, if the signal at the SP/DIF connection is an uncompressed, or a linear PCM, or already a decompressed digital audio signal, the second label and the second candidate signature can be collected without an intermediate decompression step. On the other hand, if the first label and the first candidate signature are present, they can be collected too.

According to yet another aspect of the present invention, a method of collecting tuning data includes the steps of obtaining an input digital audio signal at an SP/DIF connection, and processing the input signal in four parallel paths to obtain up to four identification data. The identification data may comprise (i) any program-identifying label that is present in the compressed audio signals, (ii) any program-identifying label that is present in the decompressed audio signals, (iii) a first candidate signature from the input signal (if it is in a compressed audio format), and (iv) a second candidate signature from the decompressed audio. All of the four possible identification data that are collected at each measurement time are assembled to form a time-stamped record that may be communicated to a store-and-forward apparatus. The store-and-forward apparatus stores in a memory at least some of the time-stamped records sent to it, and subsequently forwards the stored records to a central data collection facility. It will be clear to those skilled in the audience-measurement arts that not all of the collected data (e.g., data collected during a time when the television is turned off, or data that supports a temporal resolution finer that what is called for in the measurement) is of value, and that the triage operation performed by the store-and-forward apparatus, or by some other portion of the measurement system installed a user dwelling, reduces the cost of storing and communicating data.

According to a further aspect of the present invention, a digital signal recognition system comprises monitoring equipment tuned to all the broadcast signal sources that can be viewed in statistically selected dwellings. Preferably, the monitoring equipment collects and stores all of the first and second program-identifying labels that are present in the signal, as well as extracting reference versions of both the first and second signatures. These data are stored as time-stamped records where the interval between data collection times is the smallest acceptable interval in any of the measurements for which the data are to be used. For example, if data from a monitoring site are to be used in both an audience measurement having a minimum reportable viewing interval of ten seconds and in a commercial broadcast verification study having a contractual resolution of one half second, the monitoring site will collect data with a one half second resolution. Regardless of the resolution involved, a central facility periodically retrieves data from both one or more monitoring sites and from some predetermined number of selected dwellings, and compares the various signatures and intermediate codes in order to identify the program signals selected by the sampled audience members.

DETAILED DESCRIPTION OF THE PRESENTLY PREFERRED EXEMPLARY EMBODIMENTS

1. Introduction

While the present invention will be described with respect to television audience monitoring (e.g., Nielsen television rating) systems, it should be understood that the present invention applies equally well to radio audience monitoring, Internet audience monitoring, radio/TV commercial verification, copyright royalty collection, etc. As used herein, the term "program signal" refers to segments of various lengths such as all or parts of programs, commercials, promotional messages, public service announcements, and the like, as well as signals generated from consumer program signal storage equipment such as video cassette recorders (analog or digital), CD players, VCD players, DVD players and the like.

Briefly, the preferred embodiment receives a digital program signal and analyzes it in one or more of four different ways. First, the preferred embodiment can identify any program-identifying label that is present in compressed digital audio signals. Second, the preferred embodiment can identify any program-identifying label that is present in decompressed audio signals. Third, the preferred embodiment can identify a first candidate signature from the input signal (preferably when it is in a frame format). And fourth, the preferred embodiment can identify a second candidate signature from the decompressed audio signals. One or more of these identifications are stored in a time-stamped record which may be used immediately, or at a later time, to verify transmitted information or measure audience participation.

2. The Signal Format

Figure 1:
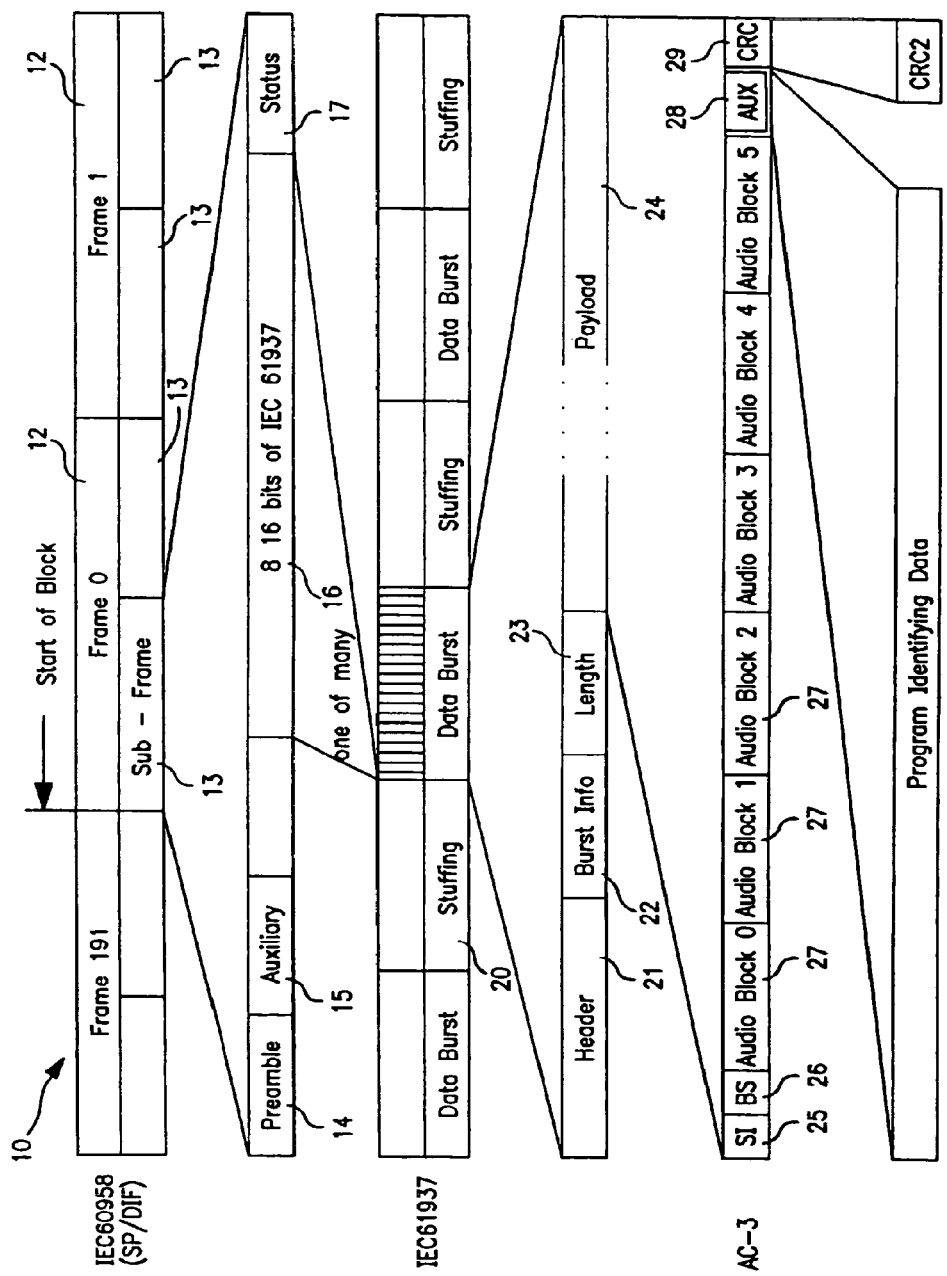
FIG. 1 is a data structure diagram of a SP/DIF bitstream where AC-3 audio data, and ID label and signature for audience research are located or extracted.

FIG. 1 depicts how AC-3 and Nielsen data fit within a SP/DIF bitstream. As depicted in FIG. 1, a SP/DIF bitstream signal 10 (as an example, here the audio is compressed in AC-3 format) is formatted based on IEC 60958 standard of International Electrotechnical Commission. It comprises a sequence of fixed-length frames 12. Each frame contains two sub-frames 13. Each of the sub-frames comprises a Preamble field 14, a Auxiliary data field 15, the data field 16 that is delivered by complying with IEC 61937 standard later, and the Status field 17. According to IEC 61937, a data burst is comprised of many IEC 60958 data fields 16. Data bursts are separated by Stuffing 20. The length of data burst is variable. Each data burst comprises a Header 21, Burst Information 22, Length 23, and a Payload 24 whose length is indicated by Length 23. Here the payload is carrying the AC-3 data. The Payload comprises SI 25, BSI 26, a number of Audio Blocks 27, and Aux data field 28, and finally, CRC2 29 which is the CRC for the entire AC-3 Frame. The last two sections are employed according to the present invention in order to conduct media research that includes measuring viewing information of the audience and monitoring programs.

The Stuffing 20 between data bursts is all zeros, however it must be noted that the IEC60958 frames still contain preamble, channel status bits, validity bits, etc. Bits 12-27 are zero. The stuffing between data bursts is used to maintain the proper synchronization of the audio out since the data channel has a capacity of a higher data rate than is necessary to convey the compressed audio content. In the "worst case" scenario, where the capacity of the data rate is fully utilized, there would be no spare Stuffing space left. However, according to statistical data from real audio contents, there typically are Stuffings available that can be altered and used for delivering additional viewing activity information from the receiver to the outside, by a resident software meter preinstalled inside the receiver. The viewing activity information can be a detailed description of what the audience (viewer) is doing with the receiver and what the receiver is doing accordingly.

In the case of digital television, video and audio data in compressed form are carried in a bit-stream using a format specified by the Advanced Television Standards Committee (ATSC). The audio data uses Dolby's AC-3 compression algorithm and the AC-3 bit-stream contains, besides the actual audio data, headers containing additional information such as synchronization, timing and sampling rate. The AC-3 stream is organized into frames and each frame contains sufficient data to reconstruct audio corresponding approximately to the duration of video frame. Each frame has a fixed size in terms of total number of 16-bit words. At the end of a frame in addition to a Cyclic Redundancy Check (CRC2 in AC-3 terminology) word designed to detect errors in the reception of the frame, there is a reserved field for inserting auxiliary data (AUXDATA). Use may be made of the AUXDATA field to carry program and station information relevant to TV audience metering. Preceding AUXDATA are two fields: AUXDATAE is a 1-bit flag which indicates valid AUXDATA is present and AUXDATAL is a 14-bit field which indicates how many bits of auxiliary data are present.

In the case of 48 kHz-sampled audio with 16-bits per sample, each AC-3 frame represents, in a compressed form, 6 "blocks" of audio. Each block is derived from 256 samples per channel. The number of channels can vary between 1 in the case of monophonic audio to 6 for the case of "5.1 channel surround sound". A multi-pass algorithm attempts to compress the data from each 256-sample block of audio in order to minimize the number of bits required to represent it. Since the frame size is fixed, at the end of the optimization process several bytes are usually available as "surplus"—in the bit stream these are defined by SKIPLE—if this bit is a "1" it means there are dummy bytes packed into the stream. Following this there is a 9-bit number SKIPL, which defines the number of bytes to skip at this point in the stream.

Most current AC-3 bit-stream generators do not make use of the auxiliary data field and as a result AUXDATAE is set to 0. In such cases, in order to utilize the AUXDATA feature, the stream may be modified by at first examining each frame to determine the total number of SKIP bytes present in the frame. These will occur at the end of each block. These will be used to create the necessary space for AUXDATA at the end of the frame. By appropriately modifying the SKIPL values at the end of each block and repacking the bits, a desired amount of space can be created for AUXDATA. In the event adequate bits to meet the AUXDATA requirements are not present, no change to the frame is made and AUXDATAE is set to 0. It may be noted that depending on the nature of the audio, not every frame will be capable of carrying auxiliary data. Indeed the Cyclic Redundancy Check words CRC1 and CRC2 have to be recomputed after these changes are made.

3. The Signal Identification Techniques

In view of the above discussion, a first technique for identifying a broadcast in a monitoring or audience-measurement system having a clock or other time keeping means operatively associated therewith includes the steps of reading a program-identifying label from an auxiliary data field of a digital audio signal frame 40, and associating the label with the time at which it was read as a time-stamped record that can be stored in a memory for subsequent communication to a central data processing facility. The second technique is similar to the first, but obtains the program-identifying label after decompressing a compressed digital audio signal.

In the first and second techniques, the number of bytes required for a program-identifying label can be relatively small. Thus, it may be possible to add a code to a signal frame even if no auxiliary data field is provided, or if the provided field is pre-empted for some other use. One could encode a program signal by writing the code in non-used portions of the frame—e.g., in padding bytes that are otherwise ignored by the ordinary audio data processing operations.

A third technique for a tuned program signal is to extract a characteristic feature, or signature, from the signal at both a statistically selected tuning site and at one or more monitoring site(s) arranged so as to monitor all broadcast signals that can be received at the tuning site. The candidate signature from the tuning site can then be compared to reference signatures from the monitoring site or sites in order to identify the tuned program by matching the signatures. Correspondingly, the broadcast of repeated program elements can be identified by comparing candidate signatures from a monitoring site with a library of reference signatures. The fourth technique is similar to the third technique, but extracts the candidate signature after decompressing a compressed digital audio signal, or from original uncompressed digital signal.

In the third and fourth techniques, the well-defined data formats used for the transmission of digital signals facilitates the identification of broadcast programs by comparing signatures. One way to compare signatures is to extract a predetermined field from a frame 10 of a digital audio signal at both a measurement site (tuning site and/or monitoring site) and a reference site. In a preferred embodiment of the invention a checksum field (which is commonly a CRC checksum) is read from each digital audio frame and is associated with a read time output from a clock or other time keeping means in a step that forms all or part of a time-stamped record. The CRC is a desirable signature because it comprises a relatively small data field that is variable enough to yield a unique signature. It will be recognized, however, that many other portions of a data frame 10 (e.g., the non-program labeling contents of an auxiliary data field) could equally well be used for this purpose.

The comparison of signatures extracted from analog signals usually requires circuitry or signal processing for handling both (i) temporal errors or drifts, and (ii) changes in the magnitudes of the signals acquired at two different locations. In the case of digital signals, however, the recognition or matching process is considerably simpler. Although the identifying algorithms must provide for "sliding" data blocks relative to each other along a time axis in order to accommodate temporal drifts or other time-keeping errors, there is no corresponding signal amplitude problems inasmuch as two matching signals will be substantially identical bit for bit.

The preferred embodiment of the invention combines all four techniques in reading a program-identifying label from an auxiliary data field of a digital audio signal frame, in reading a program-identifying label of embedded code from a decompressed or uncompressed audio signal, in reading a predetermined portion of the signal frame, in extracting a signature from a decompressed or non compressed audio signal. The labels, if found, and the predetermined portion of the signal frame and the signature are associated with the local time when the frame was read in order to generate a time-stamped tuning record for each frame of digital audio signal that is received. During operation, there may not be all four techniques present at the same time. For example, the original audio signal may be an uncompressed (linear) digital audio signal. Then, only the third and fourth techniques may be employed. Even in a compressed digital signal case, there may be a lack of a program label in an auxiliary data field for various reasons. As long as the system gets at least one label or one signature, they (it) will be associated with the local time when the frame was read in order to generate a time-stamped tuning record for each frame of digital audio signal that is received.

4. The Structure

Figure 2:
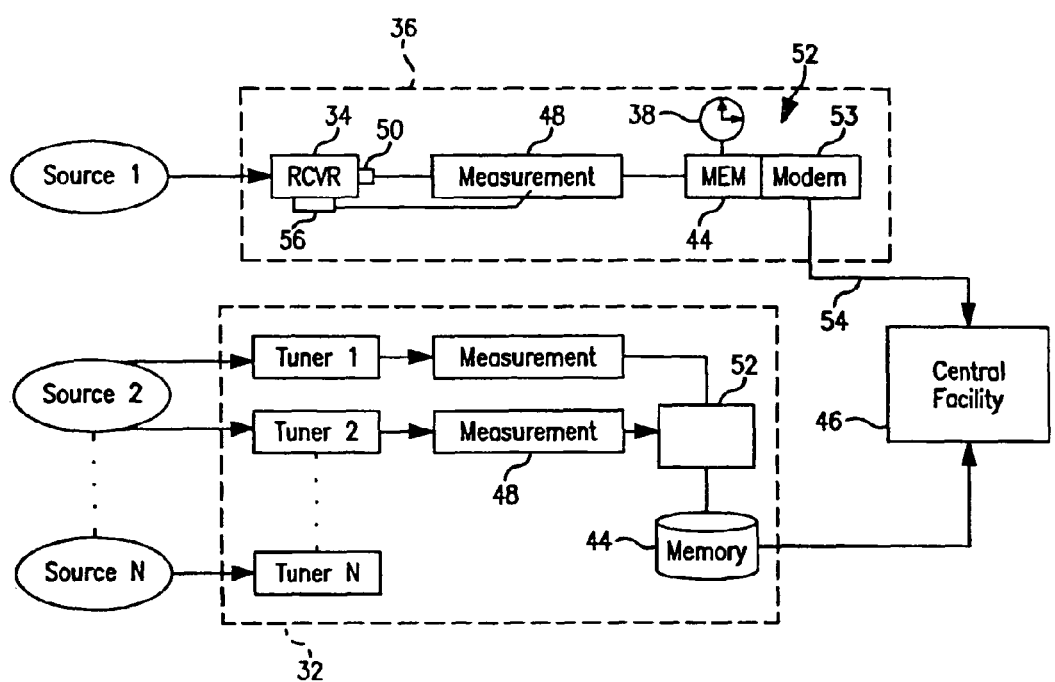
FIG. 2 is a system-level block diagram of a preferred measurement system according to an embodiment of the present invention.

In a preferred embodiment depicted in FIG. 2, a tuning or verification site 36 comprises a receiver 34, a tuning measurement apparatus 48, a clock or timing device 38, and a storage and forwarding apparatus 52. The tuning measurement apparatus 48 receives a digital audio signal output by a consumer's receiving hardware 34 at an industry-standard SP/DIF connector 50. The tuning measurement apparatus 48 decodes the signal to read a program-identifying label, if any, and to collect a predetermined portion of each signal frame for signature analysis (to be described below). The tuning measurement apparatus 48, the clock or timing device 38, and the storage and forwarding apparatus 52 (FIG. 2) may be embodied in a single computer, or in a plurality of processors, or in hard-wired circuitry. These circuits may also be incorporated into the dwelling set-top box, or as a stand-alone device.

The time-stamped records that are generated by the tuning measurement apparatus 48 are sent to a data storage and forwarding apparatus 52 that stores all or some subset of these records in a memory 44, for subsequent transmission over a public switched telephone network 54 to a central data collection facility 46 by means of a modem 53. It will be recognized that instead of a dial-up modem, other suitable communication means such as a cable modem, or a wireless data link could be used for this purpose.

In more detail, the tuning measurement apparatus 48 is configured to be connected to a SP/DIF connector 50 that is part of a consumer-owned receiving apparatus 34, which may be a digital television receiver, a set-top box feeding an analog signal to an NTSC receiver, or any other such receiving apparatus. As is provided for in industry standards, the signal at the SP/DIF connector may be either a linear PCM (uncompressed) digital audio signal at 64 kbit/sec or less, or a non-linear PCM encoded audio bitstream signal in the AC-3 format and having a bit rate of 384 kbit/sec. Although the standard allows for multiplexed AC-3 streams, the equipment that was initially placed on the market transmitted only one stream. If two or more streams were transmitted, the apparatus of the invention may be configured to select one of the AC-3 streams for decoding. It may be noted for any signal appearing at the SP/DIF connector, the apparatus 48 does not need to deal with the full DTV bitstream, which has a much higher bit rate of 19.2 Mbit/sec. Hence, the preferred embodiment is expected to be both less expensive and more reliable than alternate apparatus that acquires the full DTV signal from within the consumer's receiving equipment.

The records not stored in the memory 44 may be discarded in the interest of using the memory 44 efficiently while still providing the measurement's specified temporal signal granularity. For example, if an audience measurement is made with a guaranteed resolution of fifteen seconds from a digital broadcast signal having an interval of eight milliseconds between frame headers, the memory 44 need only retain one out of every 1875 records taken while the receiving equipment is in active use. Of course, no data need be collected when the equipment is not in use. Hence if the monitored SP/DIF connector always provides an output (e.g., as might be the case if an always-on set-top box digital receiver is used to provide a signal to an NTSC television), a separate on/off sensor 56 can provide an input to the storage and forwarding unit to indicate the time periods during which data are to be collected.

The store-and-forward apparatus 52 in the preferred embodiment assembles time-stamped records from the inputs. As noted previously, the amount of data sent from the measurement apparatus 48, which is preferably taken from each frame of the audio signal, is far in excess of what is required for an audience measurement. Hence, the store-and-forward apparatus 52 may filter the inputs and generate time-stamped records from only some of them. A monitoring site used for measurement, on the other hand, may use essentially the same processes to collect and save all the available data for subsequent comparison with data from a plurality of statistically selected dwellings.

Figure 3:
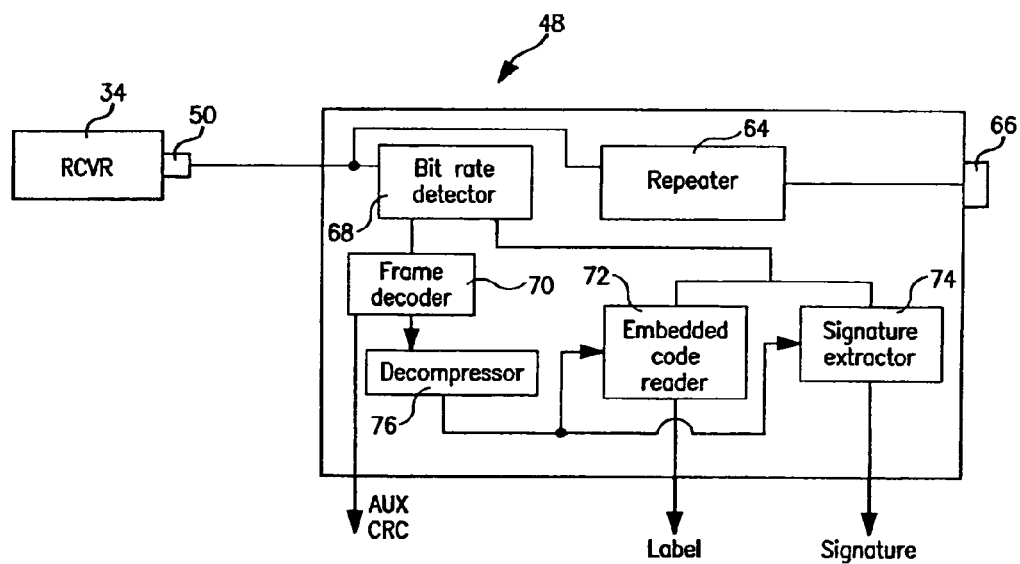
FIG. 3 is a block diagram of the measurement equipment depicted in FIG. 2.

As shown in FIG. 3, in order to avoid attenuating the signal at the receiver output, the apparatus 48 preferably comprises a repeater circuit 64 that provides a repeated signal to a second SP/DIF connector 66 that can be used to furnish signals to other consumer-owned equipment. The signal input to the apparatus 48 is fed to a bit rate detector 68 used to determine whether the signal is a uncompressed (linear) PCM signal or an AC-3 signal, to route the AC-3 signals to a frame decoder 70, and to route uncompressed PCM signals to both a embedded code reader circuit 72 (designed to extract embedded audio codes from the signal) and to a signature extractor circuit 74. If the signal is in the AC-3 format, the frame decoder 70 provides the contents of an auxiliary data field (if one is present) and a copy of a predetermined portion of the frame (e.g., the CRC field) as outputs to a store-and-forward apparatus 52. The frame decoder 70 also has an output to a decompression circuit 76 that supplies a digital signal to the embedded code reader 72 and the signature extractor 74. The signature extractor 74 may supply the candidate signature from the decompressed signal, or the candidate signal from the uncompressed signal to the storage and forwarding apparatus 52.

The preferred embodiment may collect data from a linear PCM audio signal, which may be originally uncompressed, or obtained from the transmitted non-linear PCM encoded audio bitstream signal by a decompression process that is part of the standard operation of recovering the signal that was compressed prior to transmission. The third and fourth techniques mentioned previously can be employed in these kinds of situations.

U.S. patent application Ser. No. 09/116,397, filed Jul. 16, 1998 and assigned to the assignee of this application, and U.S. patent application Ser. No. 09/428,425, filed Oct. 27, 1999, and U.S. patent application Ser. No. 09/543,480, filed Apr. 6, 2000 (each of which is incorporated herein by reference) disclose methods and apparatus for encoding audio signals by spectral modulation. These coding arrangements are selected so that the code survives subsequent compression and decompression and is hence compatible with various digital signal transmission standards. It will be recognized that other coding arrangements that have been (and will be) developed satisfy this process. Hence, the preferred embodiment of the invention attempts to recover an encoded program label from the PCM audio signal, which may be a decompressed audio signal. In other arrangements, of course, audio codes may be recovered from an analog audio signal, such as one recovered from a microphone adjacent a speaker.

As discussed earlier, it is known in the broadcast measurement arts to extract signatures from video and/or audio signals and to compare these with reference signatures extracted by similar means from known program signals. In the preferred embodiment of the invention, a signature is extracted from a linear PCM audio signal, and is stored, with other identification data as a time-stamped tuning record. Although the preferred arrangement calls for extracting this signature from a PCM digital audio data stream, those skilled in the art will recognize that one could also elect to convert the digital audio signal to an analog signal and then extract the signature by methods such as those described in U.S. Pat. Nos. 4,697, 209 and 4,677,466, (both of which are incorporated herein by reference).

5. The Process

Figure 4:
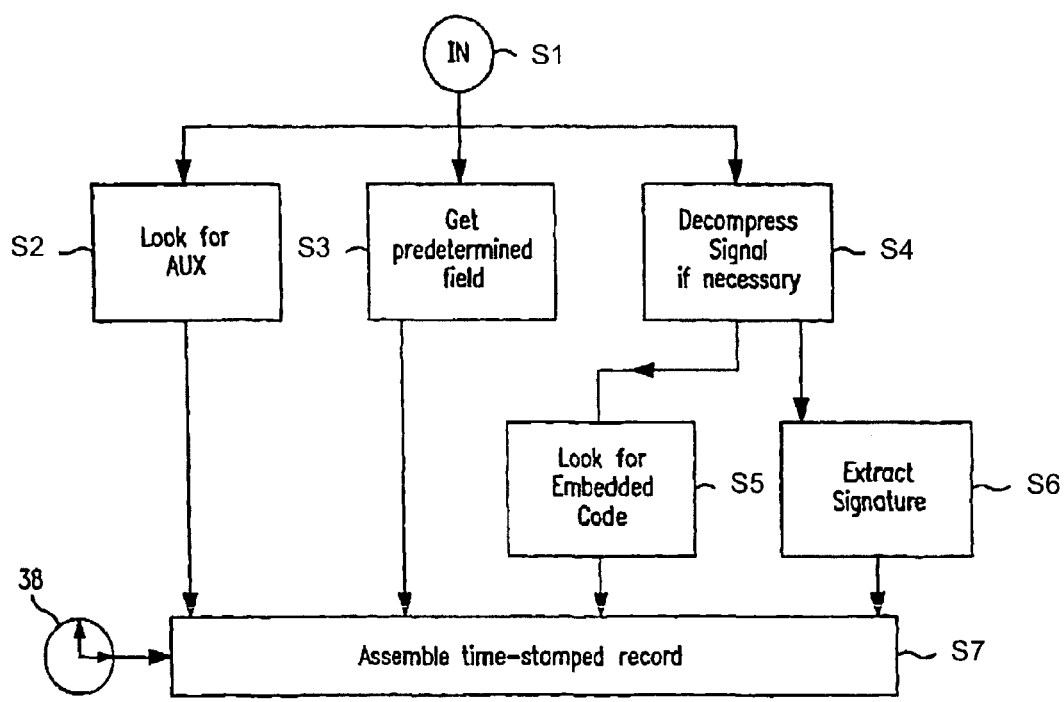
FIG. 4 is a logic diagram depicting a main loop of a program executed by a tuning measurement apparatus of the invention.

The preferred embodiment of the invention runs four identification processes on a received signal and generally operates in a parallel fashion, as depicted in the flow chart of FIG. 4. It will be recognized that inasmuch as any one of those processes can yield a positive identification of a program signal, fewer identification processes can also be used. Moreover, instead of collecting all of the identification data all of the time, one could elect to set up a hierarchical collection scheme, such as the one disclosed by Thomas et al. in U.S. Pat. No. 5,481,294 (incorporated herein by reference), that initially looks for a preferred identification datum and collects an alternate datum only if the first one is not available. For example, one could configure a system in which a program label was initially sought in an AUX field 31 of a digital signal frame and in which an embedded code was sought in the decompressed digital audio signal only if the attempt to read the AUX field failed.

Moreover, one could also elect to run multiple identification processes and to then select from among the available data at the time a time-stamped record was assembled (step 42). For example, if a positive identification label was read from an AUX field, that code and the CRC signature could be saved as the time-stamped record. To continue with the example, if no AUX code was found but an embedded code was read, the CRC signature and the embedded code could be saved for retrieval by the central data collection facility.

In FIG. 4, the digital audio signal associated with the program is obtained at the SP/DIF connection in step S1. The program-identifying label is read from the auxiliary data field of a digital audio signal frame in step S2. A checksum field (which is commonly a CRC checksum) is read from each digital audio frame and is associated with a read time output from a clock or other time keeping means 38 in a step S3 that forms all or part of a time-stamped record. If the received digital audio signal is a compressed signal, it is decompressed at step S4. In step S5, an encoded program label is recovered from the decompressed audio signal, PCM audio signal. In step S6, a signature is extracted from a linear PCM audio signal, and is stored, with any other identification data, as a time-stamped tuning record in step S7. While the preferred embodiment conducts four signal identification procedures in parallel, any combination of two or more of these procedures could be conducted in parallel or in series. For example, the process could first determine whether the received signal was compressed, and then invoke the appropriate program-identifying and signature extraction steps. One could also elect to run any combination of these identification procedures, and then select from among the available data at the time the time-stamped record was assembled.

As mentioned previously, the program label (e.g., identifying label) in the aux data field may be encoded by the broadcasters and/or program producers. As an alternative program identifying code, the broadcasters and/or any other participant in the distribution system may also insert PSIP (Program System Information Protocol), and/or Content Identification (Content ID) data, and/or other useful data in the aux data field. As yet another alternative program identifying code, the broadcasters and/or other participant in the distribution system may also copy program related data from bitstream data areas outside the aux data field into the aux data field. The statistical availability of Stuffing can be also utilized to deliver viewing activity information. Furthermore, the SP/DIF standard allows for non-audio data instead of, or in addition to, the non-linear PCM embedded audio bitstreams. The digital signatures and auxiliary codes may be effectively applied to identify or monitor non-audio data that includes Internet and other data transmission applications. All such alternatives are within the scope of the appended claims.

6. Conclusion

Thus, what has been described is a digital audio signal recognition system and method which accurately and reliably detects digital audio signals. The system according to the present invention will find use in verification sites, reference library sites, audience monitoring dwellings, and in any site where the monitoring, storing, and/or comparison of digital audio signals is required.

The individual components shown in block or schematic form in the Drawings are all well-known in the signal processing arts or are described in the documents incorporated herein by reference, and their specific construction and/or operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent structures and functions included within the spirit and scope of the appended claims.

What is claimed is:

1. An apparatus for identifying a digital audio signal, comprising:
    an input to receive the digital audio signal, wherein the digital audio signal includes data from a broadcast or a stored digital program signal;
    a detector to receive the digital audio signal from the input and to determine whether the received digital audio signal is uncompressed as received at the input;
    a decoder to receive the digital audio signal from the detector when the digital audio signal is compressed as received at the input and to identify a first program-identifying code in an auxiliary field of the compressed digital audio signal; and
    a code reader to receive the digital audio signal from the detector when the digital audio signal is uncompressed as received at the input and to receive the digital audio signal from a decompressor when the digital audio signal is compressed as received at the input, wherein the code reader is to identify a second program-identifying code in a decompressed or uncompressed portion of the digital audio signal when the first program-identifying code is not identified in the auxiliary field or when the digital audio signal is uncompressed as received at the input.

2. An apparatus as defined in claim 1, wherein one of the first and second program-identifying codes is selected for storage in a memory.

3. An apparatus as defined in claim 2, further comprising a transmitter to transmit the selected one of the first and second program-identifying codes to a collection site.

4. An apparatus as defined in claim 2, wherein the selection of the one of the first and second program-identifying codes for storage in the memory is based on a hierarchy.

5. An apparatus as defined in claim 1, further comprising a signature extractor to receive the digital audio signal from the detector when the digital audio signal is uncompressed as received at the input and to identify a signature in an uncompressed portion of the digital audio signal.

6. An apparatus as defined in claim 5, wherein the signature extractor is to receive an uncompressed form of the digital audio signal from the decompressor when the digital audio signal is compressed as received at the input and to identify a signature in a portion of the uncompressed form of the digital audio signal.

7. An apparatus as defined in claim 1, wherein at least one of the detector, the decoder, or the code reader is disposed in at least one of a dwelling, a verification site, or a monitoring site.

8. A method for identifying a digital audio signal, comprising:
    determining, with a programmed processor, whether a received digital audio signal is uncompressed as received at an input, wherein the digital audio signal includes data from a broadcast or a stored digital program signal;
    providing the digital audio signal to a decoder when the digital audio signal is compressed as received at the input;
    identifying a first program-identifying code in an auxiliary field of the compressed digital audio signal received at the decoder when the digital audio signal is compressed as received at the input;
    providing the digital audio signal to a code reader from the detector when the digital audio signal is uncompressed as received at the input;
    providing the digital audio signal to the code reader from a decompressor when the digital audio signal is compressed as received at the input; and
    identifying a second program-identifying code in a decompressed or uncompressed portion of the digital audio signal when at least one of (a) the first program-identifying code is not identified in the auxiliary field or (b) when the digital audio signal is uncompressed as received at the input.

9. A method as defined in claim 8, further comprising selecting one of the first and second program-identifying codes for storage in a memory.

10. A method as defined in claim 9, further comprising transmitting the selected one of the first and second program-identifying codes to a collection site.

11. A method as defined in claim 9, wherein selecting the one of the first and second program-identifying codes for storage in the memory is based on a hierarchy.

12. A method as defined in claim 8, further comprising providing the digital audio signal to a signature extractor from the detector when the digital audio signal is uncompressed as received at the input and identifying a signature in an uncompressed portion of the digital audio signal.

13. A method as defined in claim 12, further comprising providing an uncompressed form of the digital audio signal to the decompressor from the signature extractor when the digital audio signal is compressed as received at the input and identifying a signature in a portion of the uncompressed form of the digital audio signal.

14. A tangible computer readable storage medium comprising instructions that, when executed, cause a machine to at least:
    determine whether a received digital audio signal is uncompressed as received at an input, wherein the digital audio signal includes data from a broadcast or a stored digital program signal;

provide the digital audio signal to a decoder when the digital audio signal is compressed as received at the input;

identify a first program-identifying code in an auxiliary field of the compressed digital audio signal received at the decoder when the digital audio signal is compressed as received at the input;

provide the digital audio signal to a code reader when the digital audio signal is uncompressed as received at the input;

provide the digital audio signal to the code reader from a decompressor when the digital audio signal is compressed as received at the input; and identify a second program-identifying code in a decompressed or uncompressed portion of the digital audio signal when at least one of (a) the first program-identifying code is not identified in the auxiliary field or (b) when the digital audio signal is uncompressed as received at the input.

15. A tangible computer readable medium as defined in claim 14 having instructions stored thereon that, when executed, cause a machine to select one of the first and second program-identifying codes for storage in a memory.

16. A tangible computer readable medium as defined in claim 15 having instructions stored thereon that, when executed, cause a machine to transmit the selected one of the first and second program-identifying codes to a collection site.

17. A tangible computer readable medium as defined in claim 15, wherein selecting the one of the first and second program-identifying codes for storage in the memory is based on a hierarchy.

18. A tangible computer readable medium as defined in claim 14 having instructions stored thereon that, when executed cause a machine to provide the digital audio signal to a signature extractor when the digital audio signal is uncompressed as received at the input and to identify a signature in an uncompressed portion of the digital audio signal.

19. A tangible computer readable medium as defined in claim 18, wherein the signature extractor is to receive the digital audio signal from the decompressor when the digital audio signal is compressed as received at the input.

20. A tangible computer readable medium as defined in claim 14, wherein the computer readable medium is disposed in at least one of a dwelling, a verification site, or a monitoring site.

* * * * *